UNITED STATES PATENT OFFICE.

MAX CONRAD, OF ASCHAFFENBURG, AND WALTER BECKH, OF DARMSTADT, GERMANY.

PROCESS OF MAKING PYRIMIDIN DERIVATIVES.

No. 811,827.     Specification of Letters Patent.     Patented Feb. 6, 1906.

Original application filed November 3, 1904, Serial No. 231,267. Divided and this application filed October 21, 1905. Serial No. 283,767.

*To all whom it may concern:*

Be it known that we, MAX CONRAD, professor of chemistry and doctor of philosophy, residing at Aschaffenburg, and WALTER BECKH, doctor of philosophy, residing at Darmstadt, Germany, subjects of the German Emperor, have invented certain new and useful Improvements in the Manufacture of Pyrimidin Derivatives, of which the following is a specification.

This invention has for its object the production of 4-imino-2.6-dioxypyrimidin; and it consists in a process of condensing cyanaceticacid esters with acidyl-ureas in the presence of condensing agents, such as the alkali alcoholates, the alkali metals themselves, or their amids.

The following equation may serve to illustrate the principal reaction which takes place in the above-mentioned condensation and which is characterized by a contemporary splitting off of the acidyl groups:

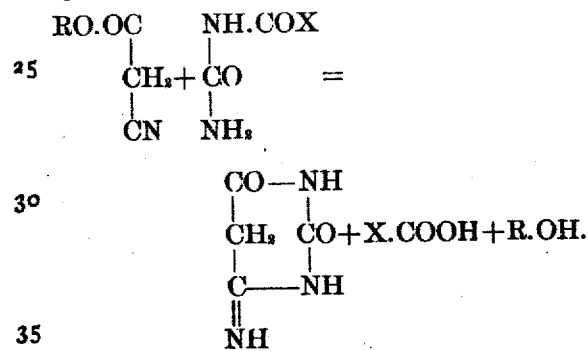

In this equation R is an alkyl group, and X is hydrogen or any known alkyl or aryl group.

The essential characteristics of the process thus indicated will be seen from the following specific example:

Example: Ninety-nine parts of cyanacetic acid methylester are mixed with twenty times the quantity of alcohol in which forty-six parts of sodium have been dissolved. After addition of one hundred parts of acetyl-urea the mixture is boiled several hours in connection with a reflux condenser. The product of reaction is then neutralized, the alcohol is distilled off, the residue taken up with water, and the 4-imino-2.6-dioxypyrimidin is set free by acetic acid.

The process proceeds in an analogous manner for the production of 4-imino-2.6-dioxypyrimidin by condensing other cyanaceticacid esters with acidyl derivatives of urea in the presence of alkali-condensing agents.

Having now described our invention and in what manner the same is to be performed, what we claim as new, and desire to secure by Letters Patent, is—

1. The process of producing 4-imino-2.6-dioxypyrimidin, which process consists in condensing acidyl derivatives of urea with cyanacetic-acid esters in the presence of alkali-condensing agents.

2. The process of producing 4-imino-2.6-dioxypyrimidin, which process consists in condensing acetyl-urea with cyanacetic-acid ester in the presence of an alkali condensing agent.

3. The process of producing 4-imino-2.6-dioxypyrimidin, which process consists in condensing acetyl-urea with cyanacetic-acid ethyl ester in the presence of an alkali-condensing agent.

MAX CONRAD.
WALTER BECKH.

Witnesses:
WALTER HOUSING,
ERNST MENNEL.